US012212810B2

United States Patent
Brown et al.

(10) Patent No.: US 12,212,810 B2
(45) Date of Patent: Jan. 28, 2025

(54) METHOD FOR AUDIO AND VIDEO JUST-IN-TIME TRANSCODING WITH COMMAND FRAMES

(71) Applicant: Mux, Inc., San Francisco, CA (US)

(72) Inventors: Adam Brown, San Francisco, CA (US); Justin Greer, Waunakee, WI (US); Matthew L. Szatmary, Concord, CA (US)

(73) Assignee: Mux, Inc., San Francisco, CA (US)

( * ) Notice: Subject to any disclaimer, the term of this patent is extended or adjusted under 35 U.S.C. 154(b) by 115 days.

(21) Appl. No.: 18/132,276

(22) Filed: Apr. 7, 2023

(65) Prior Publication Data

US 2023/0328313 A1 Oct. 12, 2023

Related U.S. Application Data

(60) Provisional application No. 63/328,640, filed on Apr. 7, 2022.

(51) Int. Cl.
*H04N 21/4402* (2011.01)
*G11B 27/34* (2006.01)
(Continued)

(52) U.S. Cl.
CPC ..... *H04N 21/440218* (2013.01); *G11B 27/34* (2013.01); *H04N 19/40* (2014.11); *H04N 21/4331* (2013.01); *H04N 21/8456* (2013.01)

(58) Field of Classification Search
CPC ........... H04N 21/440218; H04N 19/40; H04N 21/4331; H04N 21/8456; H04N 21/234309; H04N 21/23439; G11B 27/34
(Continued)

(56) References Cited

U.S. PATENT DOCUMENTS 10,547,856 B2   1/2020  Cock et al.
11,133,037 B1*  9/2021  Kalish ................... G06F 16/745
(Continued)

OTHER PUBLICATIONS

Engineering and Developers Blog, What's happening with engineering and developers at YouTube, YouTube (2018).
(Continued)

*Primary Examiner* — Loi H Tran
(74) *Attorney, Agent, or Firm* — Run8 Patent Group, LLC; Peter Miller (57) ABSTRACT

A method includes: ingesting a video; initializing a timed command stream synchronized to the video; emulating transcoding of the video to derive a sequence of video characteristics of the video; populating the timed command stream with the sequence of video characteristics; segmenting the video into a series of mezzanine segments. The method further includes: for each mezzanine segment, in the series of mezzanine segments: retrieving instream video characteristics, in the sequence of video characteristics, contained within a first segment of the timed command stream corresponding to the mezzanine segment; retrieving upstream video characteristics, in the sequence of video characteristics, preceding the first segment of the timed command stream and informing transcoding of the mezzanine segment; transforming the instream video characteristics and the upstream video characteristics into a set of transcode commands; storing the set of transcode commands in command frames; and inserting the command frames into the mezzanine segment.

19 Claims, 3 Drawing Sheets

(51) Int. Cl.
*H04N 19/40* (2014.01)
*H04N 21/433* (2011.01)
*H04N 21/845* (2011.01)

(58) Field of Classification Search
USPC .......................................................... 386/241
See application file for complete search history.

(56) References Cited

U.S. PATENT DOCUMENTS

| | | |
|---|---|---|
| 2002/0069265 A1 | 6/2002 | Bountour et al. |
| 2012/0047542 A1 | 2/2012 | Lewis et al. |
| 2014/0025837 A1 | 1/2014 | Swenson et al. |
| 2014/0040015 A1 | 2/2014 | Haley et al. |
| 2015/0067185 A1 | 3/2015 | Tamblin et al. |
| 2016/0295216 A1 | 10/2016 | Aaron et al. |
| 2017/0085634 A1 | 3/2017 | Guney et al. |
| 2017/0250855 A1 | 8/2017 | Patil et al. |
| 2019/0182554 A1 | 6/2019 | Schupak et al. |
| 2019/0208245 A1 | 7/2019 | Xu |
| 2019/0379895 A1 | 12/2019 | Katsavounidis et al. |
| 2020/0336802 A1* | 10/2020 | Russell ............ H04N 21/26603 |
| 2021/0073551 A1* | 3/2021 | Li ......................... G06F 40/205 |
| 2022/0076026 A1* | 3/2022 | Walker ................. G06V 40/161 |

OTHER PUBLICATIONS

International Search Report received in PCT/US19/14218 dated May 24, 2019.
Netflix Technology Blog, "Per-Title Encode Optimization", Medium (2014).
Zwantschko, Gernot, "What Is Per-Title Encoding?", Bitmovin (2017).

* cited by examiner

FIGURE 3

METHOD FOR AUDIO AND VIDEO JUST-IN-TIME TRANSCODING WITH COMMAND FRAMES

CROSS-REFERENCE TO RELATED APPLICATIONS

This application claims the benefit of U.S. Provisional Application No. 63/328,640, filed on 7 Apr. 2022, which is incorporated in its entirety by this reference.

This Application is also related to U.S. patent application Ser. No. 16/458,630, filed on 1 Jul. 2019, U.S. patent application Ser. No. 16/820,592, filed on 16 Mar. 2020, and U.S. patent application Ser. No. 17/031,536, filed on 24 Sep. 2020, each of which is incorporated in its entirety by this reference.

TECHNICAL FIELD

This invention relates generally to the field of audio and video transcoding and more specifically to a new and useful method for just-in-time transcoding with command frames in the field of audio and video transcoding.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
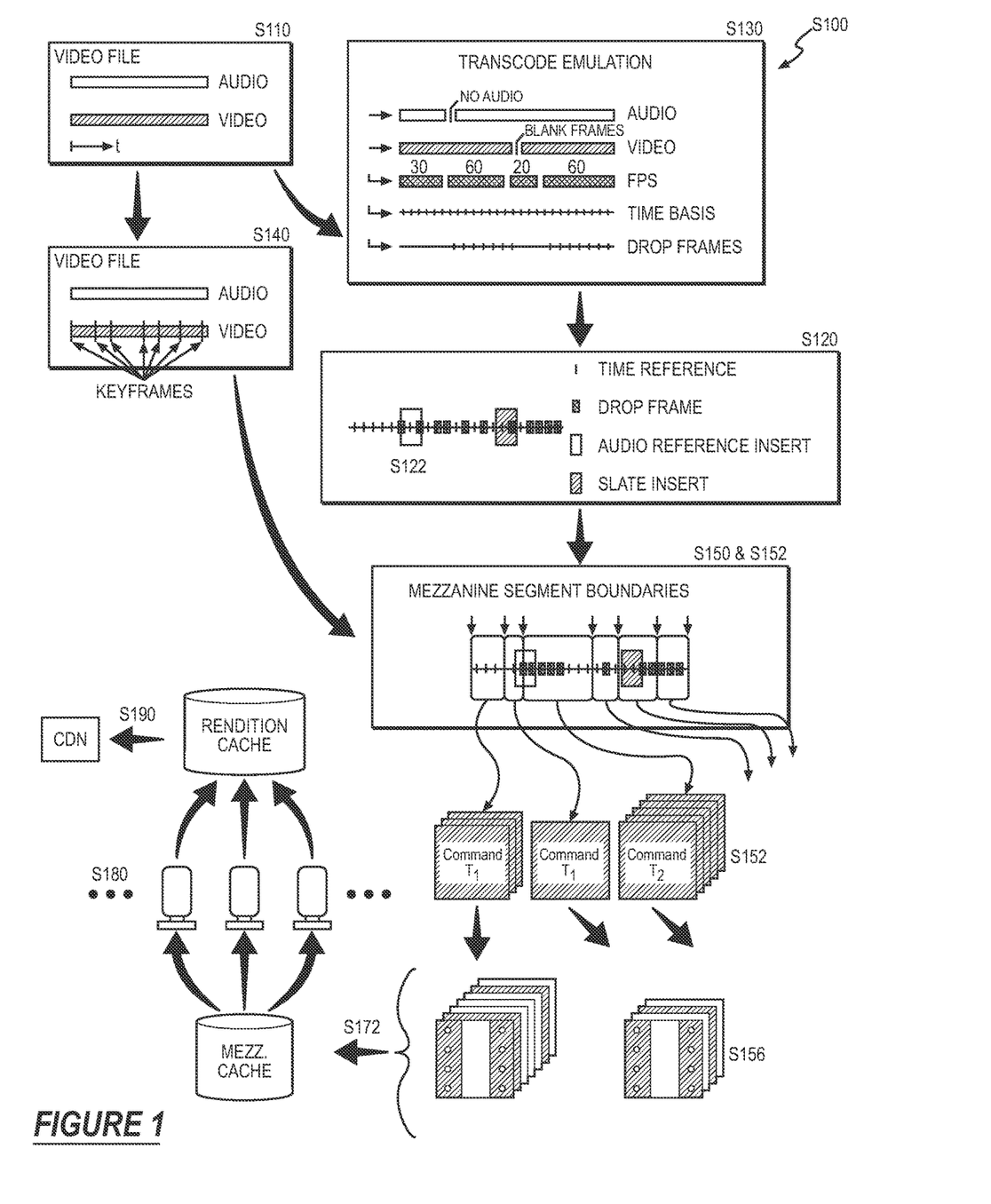
FIG. 1 is a first flowchart representation of a method.
Figure 2:
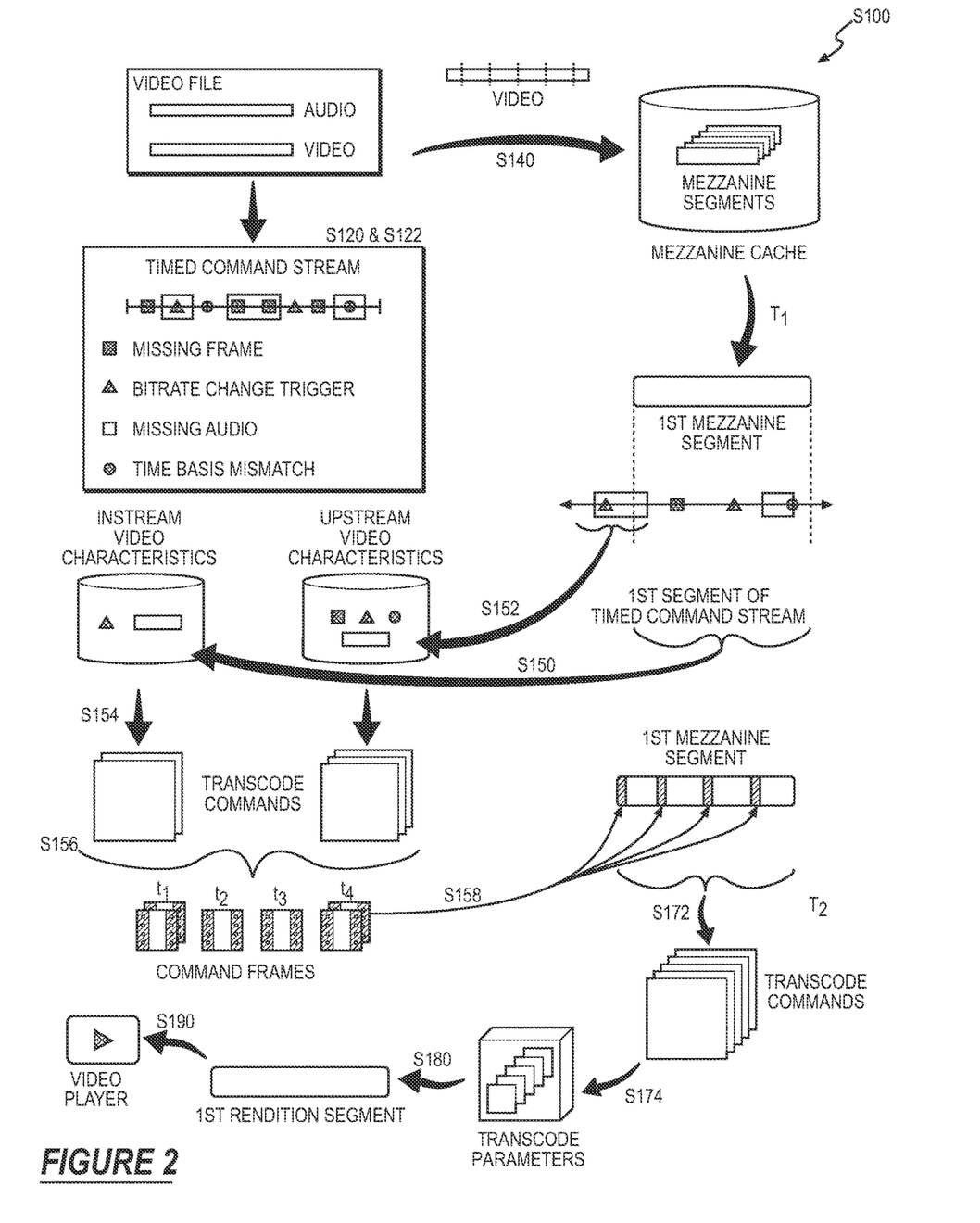
FIG. 2 is a second flowchart representation of one variation of the method.
Figure 3:
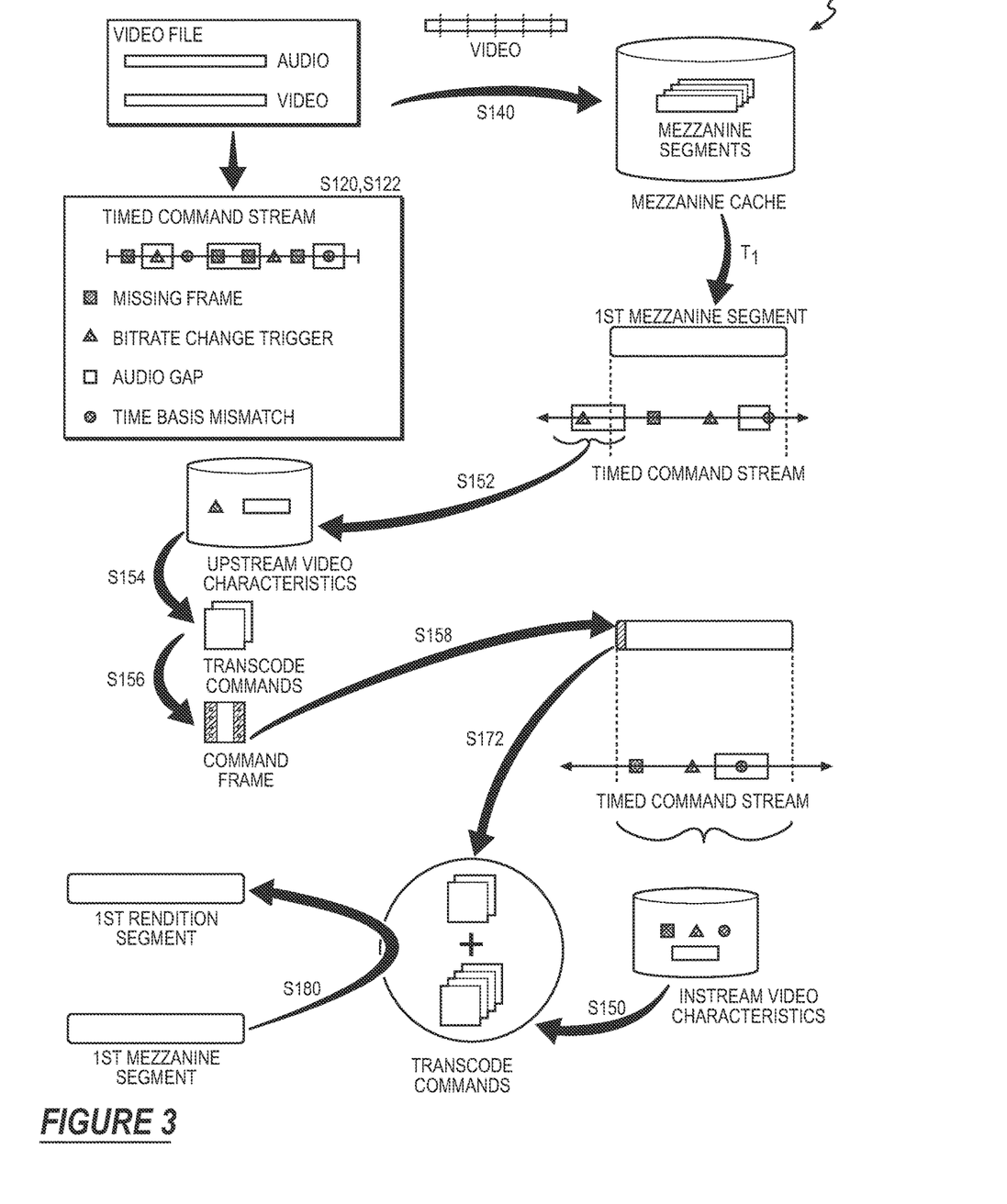
FIG. 3 is a third flowchart representation of one variation of the method.

As shown in FIG. 1, a method S100 for transcoding a video file includes: ingesting the video file; and, at a first worker, segmenting the video file into a series of mezzanine segments between a minimum segment duration and a maximum segment duration and storing the series of mezzanine segments in a mezzanine cache.

The method S100 also includes, at a codifier: initializing a timed command stream synchronized to the video feed; emulating transcoding of the video file based on a set of transcoding parameters, to derive a set of video characteristics; and populating the timed command stream with the set of video characteristics. The method S100 further includes, at the codifier, for each mezzanine segment, in the series of mezzanine segments: locating a segment boundary of the mezzanine segment in the timed command stream; aggregating video characteristics proximal the segment boundary in the time command stream into a set of commands; encoding the set of commands and a command frame identifier into a set of command frames; and inserting the set of command frames into the mezzanine segment.

The method S100 also includes, at a scheduler, assigning individual mezzanine segments, in the series of mezzanine segments, to a set of workers for transcoding.

The method S100 further includes, at a worker in the set of workers: loading a mezzanine segment assigned to the worker by the scheduler; loading a set of transcoding parameters for the mezzanine segment; concurrently parsing frames in the mezzanine segment chronologically to transcode the mezzanine segment into a rendition segment according to the set of transcoding parameters and scanning frames in the mezzanine segment for the command frame identifier; and, in response to detecting a command frame containing the command frame identifier, extracting a set of commands from the command frame and updating the set of transcoding parameters according to the set of commands.

1.1 Variation

One variation of the method S100 includes: ingesting a video file in Block S110; initializing a timed command stream synchronized to a video stream of the video file in Block S120; emulating transcoding of the video file to derive a sequence of video characteristics of the video file in Block S130; populating the timed command stream with the sequence of video characteristics in Block S122; and segmenting the video file into a series of mezzanine segments in Block S140.

In this variation, the method S100 further includes, for a first mezzanine segment, in the series of mezzanine segments: retrieving a first subset of instream video characteristics, in the sequence of video characteristics, contained within a first segment of the timed command stream corresponding to the first mezzanine segment in Block S150; retrieving a second subset of upstream video characteristics, in the sequence of video characteristics, preceding the first segment of the timed command stream and informing transcoding of the first mezzanine segment in Block S152; transforming the first subset of instream video characteristics and the second subset of upstream video characteristics into a first set of transcode commands in Block S154; storing the first set of transcode commands in a first command frame in Block S156; and inserting the first command frame into the first mezzanine segment in Block S158.

In this variation, the method S100 further includes, for a second mezzanine segment, in the series of mezzanine segments: retrieving a third subset of instream video characteristics, in the sequence of video characteristics, contained within a second segment of the timed command stream corresponding to the second mezzanine segment in Block S150; transforming the third subset of instream video characteristics into a second set of transcode commands in Block S154; storing the second set of transcode commands in a second command frame in Block S156; and inserting the second command frame into the second mezzanine segment in Block S158.

In this variation, the method S100 further includes, in response to receiving a first request for a first playback segment corresponding to the first mezzanine segment in a first rendition from a video player: accessing the first mezzanine segment in Block S160; detecting the first command frame in the first mezzanine segment in Block S170; extracting the first set of transcode commands from the first command frame in Block S172; updating a first set of transcoding parameters for the first rendition based on the first set of transcode commands in Block S174; transcoding the first mezzanine segment into a first rendition segment in a first rendition according to the first set of transcoding parameters in Block S180; and transmitting the first rendition segment to the video player in Block S190.

1.2 Variation

In another variation, the method S100 incudes: ingesting the video stream in Block S110; initializing a timed command stream synchronized to the video stream in Block S120; emulating transcoding of the video stream to derive a sequence of video characteristics of the video stream in Block S130; populating the timed command stream with the sequence of video characteristics in Block S122; and segmenting the video stream into a series of mezzanine segments in Block S140.

In this variation, the method S100 further incudes, for a first mezzanine segment, in the series of mezzanine segments: retrieving a first subset of upstream video characteristics, in the sequence of video characteristics, preceding a first segment of the timed command stream corresponding to the first mezzanine segment in Block S150; transforming the first subset of upstream video characteristics into a first set of transcode commands in Block S154; storing the first set of transcode commands in a set of command frames in Block S156; and inserting the set of command frames into the first mezzanine segment in Block S158.

In this variation, the method S100 further incudes, for a second mezzanine segment, in the series of mezzanine segments: retrieving a second subset of upstream video characteristics, in the sequence of video characteristics, preceding a second segment of the timed command stream corresponding to the second mezzanine segment in Block S150; transforming the second subset of upstream video characteristics into a second set of transcode commands in Block S154; storing the second set of transcode commands in a second set of command frames in Block S156; and inserting the second set of command frames into the second mezzanine segment in Block S158.

In this variation, the method S100 further incudes, in response to receiving a first request for a first playback segment corresponding to the first mezzanine segment in a first rendition from a video player: accessing the first mezzanine segment in Block S160; emulating transcoding of the first mezzanine segment to derive a sequence of segment characteristics of the first mezzanine segment in Block S130; transforming the sequence of segment characteristics into a third set of transcode commands in Block S154; extracting the first set of transcode commands from the set of command frames in Block S172; transcoding the first mezzanine segment into a first rendition segment in a first rendition based on the first set of transcode commands and the third set of transcode commands in Block S180; and transmitting the first rendition segment to the video player in Block S190.

1.3 Variation

In yet another variation, the method S100 includes: ingesting the video file in Block S110; initializing a timed command stream synchronized to a video stream of the video file in Block S120; emulating transcoding of the video file to derive a sequence of video characteristics of the video file in Block S130; populating the timed command stream with the sequence of video characteristics in Block S122; and segmenting the video file into a series of mezzanine segments in Block S140.

In this variation, the method S100 further includes, for each mezzanine segment, in the series of mezzanine segments: retrieving a first subset of instream video characteristics, in the sequence of video characteristics, contained within a first segment of the timed command stream corresponding to the mezzanine segment in Block S150; retrieving a second subset of upstream video characteristics, in the sequence of video characteristics, preceding the first segment of the timed command stream and informing transcoding of the mezzanine segment in Block S152; transforming the first subset of instream video characteristics and the first subset of upstream video characteristics into a first set of transcode commands in Block S154; storing the first set of transcode commands in a set of command frames in Block S156; inserting the set of command frames into the mezzanine segment in Block S158; and storing the mezzanine segment in a mezzanine cache in Block S220.

2. Applications

Generally, a computer system—such as computer network including clustered or distributed workers—can execute Blocks of the method S100 to ingest, codify, and transcode an inbound video and to return a video rendition for immediate publication or distribution to other devices. In particular, the computer system can execute Blocks of the method S100 to separate: transcoding of individual segments of the inbound video by isolated workers; from derivation of video characteristics (e.g., video characteristics, which inform transcoding) for these individual video segments based on the entire inbound video available. More specifically, a codifier executes Blocks of the method S100 to prepare individual video segments for transcoding by injecting transcoder-readable command frames into individual video segments based on more comprehensive access to the entire video file. An individual worker—in a cluster of many workers—can then: detect a set of command frames in its assigned video segment; extract commands (e.g., transcode parameters) from this set of command frames; and transcode its assigned video segment based on these commands.

Generally, the computer system can include or interface with a codifier, a scheduler, and a set of workers to ingest and transcode a live video stream into one or more renditions in real-time and on-demand based on renditions requested by or selected for a population of devices accessing the live video stream. Additionally or alternatively, the codifier can ingest a pre-recorded (i.e., stored) video file, emulate transcoding of the video file, and generate a timed command stream paired with the video file. The scheduler and the set of workers can then cooperate to transcode the video file into one or more renditions on-demand based on the time command stream and renditions requested by or selected for a population of devices accessing the live video stream.

2.1 Transcoding Emulation

In particular, the codifier emulates a transcoder: to process an entire pre-recorded video file or a total live video stream ingested up to a current time; to derive dynamic characteristics of the video along its entire available length; and to derive video characteristics throughout the entire available length of the video given these characteristics. The codifier then: converts these video characteristics into a series of commands temporally-aligned (or "synchronized") to the video file; stores these commands in command frames; and inserts these command frames into the video file.

The scheduler then: segments the video file—including command frames—into a set of mezzanine segments; and coordinates assignment and distribution of these mezzanine segments to individual workers executing instances of a transcoder (e.g., a just-in-time transcoder described in U.S. patent application Ser. No. 16/458,630) for transcoding in isolation of other mezzanine segments derived from the video file.

Alternatively, the scheduler can segment the video file into a set of mezzanine segments. The codifier can: concurrently emulate a transcoder; generate command frames in light of the entire available video and boundaries of individual mezzanine segments; and insert command frames into the mezzanine segments. The scheduler can then coordinate assignment and distribution of these mezzanine segments to individual workers executing instances of a transcoder for transcoding in isolation of other mezzanine segments derived from the video file.

Once assigned and released by the scheduler, an individual worker executing an instance of a transcoder: ingests a mezzanine segment; detects a set of command frames in the mezzanine segment; extracts commands from these command frames; and transcodes the segment according to these commands.

2.2 Transcoding Emulation Example

For example, the scheduler can: segment the video file into mezzanine segments between two and five seconds in length; and distribute these short-duration mezzanine segments to many workers for rapid, parallel (i.e., concurrent) transcoding in any mezzanine segment order. However, container, header, and/or other metadata for the video file may not be available or may not be readable by a transcoder during transcode. Metadata and characteristics of other mezzanine segments of the whole video file are also not visible or available to a particular worker to inform transcode parameters for a mezzanine segment assigned to this worker. Accordingly, multiple workers transcoding different mezzanine segments of the video file may elect different—and possibly very different—transcoding parameters when transcoding their assigned mezzanine segments and may thus cooperatively output consecutive rendition segments that exhibit different bitrate, compression, frame rate, audio alignment, slate insertion, time bases, and/or other characteristics. A user viewing playback of these rendition segments at a device (e.g., a smartphone) may thus perceive inconsistent or disrupted video quality at playback.

Therefore, the codifier can execute Blocks of the method S100 to: emulate a transcoder transcoding the entire available inbound video stream or file to derive video characteristics throughout the inbound video stream or file—with full access to past data of the inbound video stream or file—without actually transcoding the inbound video stream or file; store these video characteristics in command frames; and insert these command frames into mezzanine segments of the video stream or file. The scheduler can also: segment the video stream or file into mezzanine segments, such as between keyframes and between minimum and maximum segment durations; and schedule a cluster of workers—executing instances of a transcoder—to transcode individual mezzanine segments of the video stream or file based on the video characteristics.

3. Terms

Generally, the term "stream," present herein, refers to a bitstream of encoded audio, video, and/or any other data between two devices or computational entities executing on devices (e.g., AV players executing on a mobile computing devices), such as an HLS, HDS, or MPEG-DASH stream. The computer system can initiate streams between servers within the computer system, between the computer system and a content delivery network (hereinafter "a CDN"), and/or between the computer system and any other computational device.

Generally, the term "segment," present herein, refers to a series of encoded audio and/or encoded video data spanning a discrete time interval, such as a consecutive series of frames in a video file or AV stream (hereinafter the "video stream").

Generally, the term "mezzanine," present herein, refers to a compressed master video file that supports transcoding in additional compressed video streams and video file (or "renditions," downloads). For example, a mezzanine can include a highest-quality (e.g., high bitrate and high resolution) encoding (i.e., a bitrate resolution pair) of a video file cached by the computer system and derived from an original version of the video file uploaded to the computer system. In this example, a "mezzanine segment" can refer to a segment of a video file encoded at a highest-quality encoding for the video file.

Generally, the term "rendition" refers to an encoding of a video file indicated in a rendition manifest or manifest file (e.g., an HLS manifest) for a stream of the video file. Therefore, a "rendition segment" refers to a segment of the video file transcoded at a bitrate and/or resolution different from a corresponding mezzanine segment. The computer system can transcode a mezzanine segment into multiple corresponding rendition segments in various renditions representing the same time interval in the video file at differing bitrates and resolutions.

Generally, the computer system can interface directly with an AV player instance on a local computing device. Alternatively, the computer system can serve a stream of the video file to a content delivery network (hereinafter "CDN"), which can relay the stream of the video file to the AV player instance. For ease of explanation, any discussion herein of requests by an AV player instance are also applicable to requests by CDNs.

4. Video Ingest and Mezzanine

As shown in FIG. 1, the computer system stores a video file in order to prepare the original encoding of the video file for streaming. Generally, the computer system temporarily stores an inbound video file in order to process and prepare the video file for subsequent Blocks of the method S100.

In one implementation, once the computer system normalizes the video file and stores the normalized video file in a mezzanine format (e.g., a normalized original or root format from which other versions of the video file are transcodable), the computer system can discard the original ingested video file. In one implementation, the method S100 includes receiving an HTTP post request to upload the file to the computer system executing the method S100. Additionally or alternatively, the computer system can receive a URL specifying the current storage location of the video file via an HTTP post, and the system can download the video file from the current storage location of the video file. However, computer system can store the video file in any other way.

Before performing keyframe identification, the computer system can normalize the video file by: identifying keyframe timestamps in the video file; and segmenting the video file into a set of mezzanine segments according to the identified keyframe timestamps.

The computer system can also selectively transcode, transmux, or remux an ingested video file, such as based on detected characteristics of the video file, in order to prepare the ingested video file for segmentation. For example, the computer system can transcode, transmux, or remux the ingested video file based on: the audio codec and video codec of the encoded audio data and the encoded video data respectively; and/or a container format in which the encoded audio data and the encoded video data are stored. In one example, the computer system normalizes to the AAC audio codec, the H.264 video codec, and the MPEG-TS container format.

In another implementation, the computer system detects the audio codec, video codec, and container format of the inbound video file. If the detected container format differs from a target or preferred container format, the computer system can transmux the ingested video file into the preferred container format. Additionally or alternatively, if the detected audio or video codec for the encoding of the audio and video data of the video file differs from the target or preferred audio or video codec, the computer system can transcode the encoded audio data and/or the encoded video data using the preferred codec.

The computer system can then store and process the resulting mezzanine as described below.

5. Mezzanine Segment Preparation

Block S140 of the method S100 recites: segmenting the video file and/or the video stream into a series of mezzanine segments. Generally, in Block S140, the computer system can separate the ingested video (e.g., video file, video stream) into a set (or series) of segments in a mezzanine format.

In particular, upon ingest (e.g., upload, retrieval) of a raw video file, the computer system transcodes the raw video into a mezzanine video file. Alternatively, the computer system can ingest the video file in a mezzanine format.

Following ingest, a first worker (or the computer system, etc.): segments the mezzanine into mezzanine segments, such as based on keyframes and minimum and maximum segment durations (e.g., between two and five seconds; between two and ten seconds); and stores these mezzanine segments in a video cache, such as described in U.S. patent application Ser. No. 16/458,630.

In one implementation, the computer system can: segment the video file into the series of mezzanine segments, wherein each mezzanine segment in the series of mezzanine segments corresponds to a playback segment of the video file in a mezzanine format; and store the series of mezzanine segments in a mezzanine cache. Therefore, the computer system can prepare the video (e.g., video file, video stream) for parallel transcoding by separating the video file into the series of segments in mezzanine format (e.g., mezzanine segments) where each segment corresponds to a playback segment of the video.

The codifier concurrently: retrieves transcoding parameters for an output rendition of the video file, such as target bitrate, resolution, frame rate, codec, container, and/or a variable or constant bitrate setting, etc.; and processes video by emulating a transcoder based on these transcoding parameters, such as concurrently or after the first worker segments the mezzanine into mezzanine segments.

6. Transcoding Emulation

Block S130 of the method recites: emulating transcoding of the video file to derive a sequence of video characteristics of the video file. Generally, in Block S130, the system (e.g., the codifier) can, in order to derive video characteristics throughout the entire available length of the video, process: an entire pre-recorded video file; and an entire mezzanine (e.g., video file in a mezzanine format), of a total live video stream ingested up to a current time. Therefore, the computer system can derive a sequence of video characteristics that informs transcoding of the video. In particular, after emulating transcoding, the computer system can transform a subset of video characteristics into a set of transcode commands, and store the set of transcode commands in a command frame in the video. During transcoding, the computer system can extract the transcode commands from the command frame and use the transcode commands to update the transcoding parameters used in transcoding the video into a target rendition.

In particular, the codifier can: emulate a transcoder to process an entire pre-recorded video file, such as a complete stored mezzanine of a video uploaded by a user; and thus derive video characteristics throughout the entire length of the video file. Alternatively, the codifier can: emulate a transcoder to process an entire mezzanine of a live video stream ingested up to a current time; and thus derive video characteristics of the entire length of the live video stream available up to a current time. In this implementation, the codifier can repeat the process to re-emulate the transcoder and re-process the entire length of available video upon receipt of each subsequent length (e.g., mezzanine segment) of the live video stream. Yet alternatively, the codifier can: emulate the transcoder to process an individual mezzanine segment in a stored video or received in the live video stream; thus derive video characteristics of the mezzanine segment individually; combine video characteristics of the mezzanine segment with video characteristics of preceding of mezzanine segments (e.g., mezzanine segments preceding the mezzanine segment) in the stored video or live video stream; and repeat this process for each individual mezzanine in the stored video or live video stream.

In one implementation, the codifier emulates transcoding of the video file based on a first set of transcoding parameters associated with a target rendition to derive the sequence of video characteristics. Therefore, the codifier can emulate transcoding of the video for a target rendition in anticipation of video segments being requested in the target rendition. More specifically, the codifier can emulate transcoding of the video for the target rendition based on transcoding parameters, such as target bitrate, resolution, frame rate, codec, container, and/or a variable or constant bitrate setting, of the target rendition. For example, the codifier can emulate transcoding of a video for the first target rendition in response to receiving a request for a playback segment of the video in the first target rendition.

In another implementation, the codifier can emulate transcoding of the video file based on a second set of transcoding parameters associated with a set of supported renditions, to derive the sequence of video characteristics. Therefore, the codifier can emulate transcoding of the video into a set of target renditions. For example, the codifier can emulate transcoding for a first target rendition, a second target rendition, and a third target rendition simultaneously.

In this implementation, during transcoding of a mezzanine segment into the first target rendition in the set of target renditions, the computer system can extract the first sequence of transcode commands from the first sequence of command frames and extract a subset of transcode commands from the first sequence of transcode commands, the subset of commands corresponding to commands for the first target rendition. Furthermore, the computer system can update a first set of transcoding parameters based on the subset of transcode commands. Therefore, the computer system can update the first set of transcoding parameters corresponding to the first rendition based on the subset of transcode commands corresponding to the first rendition. In this implementation, in response to receiving a second request for the mezzanine segment in the second target rendition, the computer system can extract a second subset of transcode commands from the first sequence of transcode commands, the second subset of transcode commands corresponding to transcode commands for the second target rendition, and update a second set of transcode parameters (e.g., parameters for the second target rendition) based on the second set of transcode commands. Thus, emulating transcoding for a set of target renditions to generate the first sequence of transcode commands, the computer system can transcode the mezzanine segments into any rendition in the set of target renditions based on the first sequence of transcode commands.

In yet another implementation, the codifier can emulate transcoding twice, including: in a first instance to process an entire pre-recorded video file and to derive video characteristics throughout the entire available length of the video; and in a second instance to process an individual mezzanine segment and to derive segment characteristics of the mezzanine segment. For example, in a first instance, the codifier can only derive video characteristics that span more than one segment of the video, such as large audio gaps. Thus, the computer system can identify upstream video characteristics for a mezzanine segment based on the video characteristics derived during the first transcoding emulation. In this example, at the second instance, the codifier can only derive segment characteristic that are contained within a mezzanine segment, such as missing video frames. Thus, the computer system can identify in-segment video characteristics for a mezzanine segment based on the video characteristics derived during the second transcoding emulation. Therefore, the computer system can reduce time spent emulating transcoding by first deriving a portion of video characteristics for the whole video at a first time, and deriving the segment-specific video characteristics for individual mezzanine segments on demand (e.g., in response to receiving requests for a mezzanine segments), which can be done in parallel by the one or more workers of the computer system.

7. Derivation of Video Characteristics

Blocks S120 and S122 of the method S100 recite: initializing a timed command stream synchronized to a video stream of the video file; and populating the timed command stream with the sequence of video characteristics. Therefore, in Blocks S120 and S122, the computer system can initialize the timed command stream that is synchronized to the video file and record the video characteristics derived during transcoding emulation in the timed command stream such that each transcoding characteristic in the timed command stream is synchronized to the time of its occurrence in the video file. The timed command stream enables the computer system to retrieve a subset of instream video characteristics corresponding to a particular mezzanine segment by aggregating the video characteristics contained within a segment of the timed command stream corresponding to the mezzanine segment.

In one implementation, the codifier then processes the entire mezzanine—representing the entire raw video file—to derive a series of video characteristics sequenced to the entire mezzanine. For example, the codifier can detect: whether the mezzanine contains any audio; whether the mezzanine contains any video contact other than blank frames; presence of audio gap periods (which may span multiple mezzanine segments) in the mezzanine; presence of video gap periods (which may span multiple mezzanine segments) in the mezzanine; and/or presence of bitrate change triggers in the mezzanine based on video characteristics throughout the mezzanine (e.g., if a variable bitrate setting is active for the inbound video file); etc. The codifier can then: initialize a timed command stream synchronized to the mezzanine; and store flags for these detected characteristics of the mezzanine at corresponding timed positions in the timed command stream, such as ID3 for an inbound video file in TS video format or in emessages for an inbound video file in MP4 video format.

In one implementation, the computer system can emulate transcoding of the video stream to derive the sequence of video characteristics of the video stream by: parsing frames in the video segment chronologically; at a first time in the video segment, identifying a first video characteristic; and, at a second time in the video segment, identifying a second video characteristic. In this implementation, the computer system can populate the timed command stream with the sequence of video characteristics by: appending the first video characteristic to the timed command stream at a first time instance corresponding to the first time in the video segment; and appending the second video characteristic to the timed command stream at a second time instance corresponding to the second time in the video segment. Therefore, the computer system can generate a timed sequence (e.g., timeseries) of video characteristics in the timed command stream by retaining temporal information of the occurrence and/or the duration of each video characteristic in the sequence of video characteristics. The computer system can later use this temporal information to schedule transcode commands and/or to aggregate the transcode commands into command frames.

Additionally or alternatively, the codifier can: generate flags for video gap periods along the mezzanine for slate insertion; and store flags—for insertion of slate frames into output renditions—in the timed command stream.

Additionally or alternatively, the codifier can: identify containers of the output rendition and the mezzanine container that support different time bases; generate a virtual time basis for the duration of the mezzanine that supports timestamp adjustment and temporal realignment of rendition segments; and store the virtual time basis in the timed command stream (or in a second time basis stream) paired with (e.g., synchronized to) the mezzanine.

Additionally or alternatively, the codifier can: retrieve a framerate downsampling parameter specifying reduced target framerate of the rendition output; identify individual frames to drop (e.g., every other frame for a 50% reduction in framerate, everything third frame for a 33% reduction in framerate) across the entire mezzanine based on this framerate downsampling parameter; store frame drop flags at corresponding positions in the timed command stream; and/or generate a table of frame identifiers of these flagged frames to drop from the mezzanine.

8. Command Stream Segmentation

Block S150 of the method S100 recites: retrieving a first subset of instream video characteristics, in the sequence of video characteristics, contained within a first segment of the timed command stream corresponding to the first mezzanine segment. Generally, in Block S150, the computer system can select a subset of instream video characteristics that were derived from the segment of the video that corresponds to the mezzanine segment. Thus, the computer system can use the subset of instream video characteristics to inform transcoding of the mezzanine segment.

Block S152 of the method S100 recites: retrieving a second subset of upstream video characteristics, in the sequence of video characteristics, preceding the first segment of the timed command stream and informing transcoding of the first mezzanine segment. Generally, in Block S152, the computer system can select a subset of upstream video characteristics that were derived from the segments of the video that precede the mezzanine segment. Thus, the computer system can use the subset of upstream video characteristics to inform transcoding of the mezzanine segment.

In one implementation, the computer system can retrieve a first subset of instream video characteristics, in the sequence of video characteristics, contained within the first segment of the timed command stream corresponding to the first mezzanine segment by: locating segment boundaries of the first mezzanine segment in the first segment of the timed command stream; and aggregating video characteristics within the segment boundaries in the first segment of the timed command stream into the first subset of instream video characteristics. Therefore, the computer system can select the subset of instream video characteristics that correspond to the first mezzanine segment by aggregating video characteristics within segment boundaries of the first segment of the timed command stream, which corresponds to the first mezzanine segment. In this implementation, the computer system also can retrieve a second subset of upstream video characteristics, in the sequence of video characteristics, preceding the first segment of the timed command stream: locating an upstream segment boundary of the first mezzanine segment in the first segment of the timed command stream; and aggregating video characteristics preceding the upstream segment boundary in the first segment of the timed command stream into the first subset of instream video characteristics. Therefore, the computer system can select the subset of upstream video characteristics that precede the first mezzanine segment by aggregating video characteristics preceding the segment boundaries of the first segment of the timed command stream, which corresponds to the first mezzanine segment.

In one implementation, the codifier: projects boundaries of individual mezzanine segments onto the timed command stream; and populates segments of the timed command stream corresponding to individual mezzanine segments with additional cross-segment video characteristics and/or upstream video characteristics based on characteristics of preceding and succeeding mezzanine segments and nearby data contained in the timed command stream.

In this implementation, for a first mezzanine segment, the codifier projects a boundary of the first mezzanine segment onto the timed command stream and aggregates inter-segment video characteristics around this boundary on the timed command stream, such as including: audio lead-in characteristics of the mezzanine preceding and leading into the first mezzanine segment; audio lead-out characteristics of the mezzanine succeeding and leading out of the first mezzanine segment; a slate tagged to a video gap detected earlier in the mezzanine and contiguous with a video gap in the first mezzanine segment; and a bitrate assignment preceding the first mezzanine segment (e.g., for a variable bitrate setting for the output rendition). The codifier then writes these inter-segment video characteristics into the first segment of the timed command stream corresponding to the first mezzanine segment In this implementation, for a first mezzanine segment, the codifier projects a boundary of the first mezzanine segment onto the timed command stream and aggregates upstream video characteristics preceding this boundary on the timed command stream, such as including: audio lead-in characteristics of the mezzanine preceding and leading into the first mezzanine segment; a slate tagged to a video gap detected earlier in the mezzanine and contiguous with a video gap in the first mezzanine segment; and a bitrate assignment preceding the first mezzanine segment (e.g., for a variable bitrate setting for the output rendition). The codifier then writes these upstream video characteristics into the first segment of the timed command stream corresponding to the first mezzanine segment.

9. Command Generation

Block S154 of the method S100 recites: transforming the first subset of instream video characteristics and the second subset of upstream video characteristics into a first set of transcode commands. Generally, in Block S154, the computer system can generate transcode commands that reflect video characteristics contained within the mezzanine segment and preceding the mezzanine segment. Thus, the computer system can transcode the mezzanine segment based on the set of transcode commands and produce a higher quality video by accounting for the video characteristics of the mezzanine segment.

The codifier then: transforms all video characteristics (e.g., instream video characteristics, upstream video characteristics) within the first segment of the timed command stream into a set of commands; and compiles (or "encodes") these commands into one or more command frames.

For example, the codifier can: convert audio lead-in characteristics in the first segment of the timed command stream into an audio lead-in synchronization command; convert audio lead-out characteristics in the first segment of the timed command stream into an audio lead-out synchronization command; convert virtual time basis data in the first segment of the timed command stream into a timestamp adjustment command; convert identifiers of frames flagged for deletion into frame drop commands for specific frames in the first mezzanine segment; convert identifiers of frames flagged for deletion into a command to drop a first frame in the first mezzanine segment and a frame drop interval across the first mezzanine segment; convert a first bitrate flag at the start of the first segment of the timed command stream into a command for a default or starting bitrate for the first segment; and/or convert a second bitrate flag later in the first segment of the timed command stream into a command to change bitrate during the first segment; etc.

In another example, the codifier: converts slate insertion flags for a series of frames in the first segment into a slate insertion command containing a slate image and identifiers (e.g., frame number, frame count, or timestamp) of each corresponding frame to replace with the slate image; and converts slate insertion flags for a series of frames in the first segment into a slate insertion command containing a link to a slate image (e.g., stored in a database) and identifiers of each corresponding frame in the first mezzanine segment to replace with the slate image.

10. Examples of Derived Video Characteristics and Corresponding Commands

The computer system can emulate transcoding of the video to derive video characteristics of the video. For example, the computer system can derive the video characteristics including missing frames, frame rate change triggers, audio gaps, target speech expressions, time bases of video containers, and/or audio initiation/termination frames in the video. The computer system can then convert these video characteristics into transcode commands such as frame rate change commands, video frame insertion commands, audio insertion commands, audio synchronization commands, audio replacement commands, and/or timestamp adjustment commands. The computer system can store these transcode commands in command frames and insert these command frames into mezzanine segments of the video. While transcoding the mezzanine segments individually, the computer system can extract the transcode commands from the command frames in each mezzanine segment and execute the transcode commands to: drop frames in the mezzanine segment, insert frames in the mezzanine segment, adjust time basis in the mezzanine segment, synchronize audio between mezzanine segments, and/or replace an audio segment.

10.1 Frame Rate Downsampling Command

In one example, the computer system can retrieve a first subset of instream video characteristics including a frame rate of the first segment of the timed command stream exceeding a target frame rate associated with the target rendition. Therefore, the computer system can identify a frame rate or the mezzanine segment and compare the frame rate of the mezzanine segment to the target frame rate of the target rendition. In this implementation, the computer system can also transform the first subset of instream video characteristics into the first set of transcode commands including instructions to drop certain frames in the first mezzanine segment. Therefore, in response to identifying that the frame rate of the mezzanine segment exceeds the target frame rate of the target rendition, the computer system can generate a command to drop certain frames in the mezzanine segment when transcoding the mezzanine segment.

10.2 Missing Frame Replacement Command

In one example, the computer system can: retrieve the first subset of instream video characteristics including a missing frame corresponding to a timestamp in the first segment of the timed command stream; and, in response to retrieving the first subset of instream video characteristics including the missing frame, the computer system can add to the first subset of instream video characteristics a slate insertion flag specifying the missing frame and the timestamp in the missing frame. Therefore, the computer system can identify a missing frame in a mezzanine segment and, in response to identifying a missing frame in the mezzanine segment, create a slate insertion flag specifying the missing frame and add the slate insertion flag to the subset of instream video characteristics of the mezzanine segment. In this implementation, the computer system can further: convert the slate insertion flag in the first subset of instream video characteristics into a slate insertion command in the first set of transcode commands, the slate insertion command containing a link to a slate image and the timestamp, the timestamp indicating a temporal position in the first mezzanine segment for slate image insertion. Therefore, the computer system can convert the slate insertion flag into a slate insertion command to replace the missing frame with a slate image during transcoding. For example, during transcoding, the computer system can transcode the first mezzanine segment into the first rendition segment in the first rendition according to the first set of transcoding parameters by: accessing the slate image via the link to the slate image; generating a blank frame at the timestamp in the first rendition segment; and inserting the slate image into the blank frame.

10.3 Inter-Frame Audio-Synchronization Command

In one example, the computer system can retrieve the first subset of instream video characteristics including an audio lead-in characteristic of the first segment of the timed command stream. For example, the computer system can retrieve information about first audio frame of the segment and/or information about audio wavelength and amplitude across various channels at the first several time instances in the segment. In this implementation, the computer system can also retrieve the second subset of upstream video characteristics including an audio lead-out characteristic of the preceding segment of the timed command stream preceding the first segment of the timed command stream. Therefore, the computer system can identify the audio lead-out characteristic (e.g., last audio frame of the segment, audio wavelength and amplitude across various channels in the last several time instances in the segment) of the mezzanine segment upstream of the first mezzanine segment. Furthermore, the computer system can use the audio lead-in characteristic of the first mezzanine segment and the lead-out characteristic of the preceding mezzanine segment to synchronize audio of the first segment and the preceding segment. In this implementation, the computer system can further convert the audio lead-in characteristic and the audio lead-out characteristic in the first subset of instream video characteristics and the second subset of upstream video characteristics into an audio synchronization command in the first set of transcode commands, the audio synchronization command including instructions to synchronize a first audio stream of the first segment to the second audio stream of the preceding segment. Therefore, the computer system can generate a command to synchronize audio in the current mezzanine segment to the audio of the preceding mezzanine segment such that there is no perceivable audio gap between two playback segments represented by the first mezzanine segment and the preceding mezzanine segment.

10.4 Time Basis Adjustment Command

In one example, the computer system can retrieve a third subset of instream video characteristics comprising a first container of second mezzanine segment, the first container of the second mezzanine segment supporting a different time basis than a second container associated with the target rendition. In this implementation, the computer system can further transform the third subset of instream video characteristics into a command in the second set of transcode commands, the command including instructions to convert a timestamp associated with a first instream video characteristic in the subset of instream video characteristics from a mezzanine time basis to a target time basis associated the target rendition. Therefore, in response to identifying that the mezzanine segment and the target rendition support different time bases, the computer system can generate a command to adjust timestamps of the video characteristics in the subset of instream video characteristics. Additionally, or alternatively, in response to identifying that the mezzanine segment and the target rendition support different time bases, the computer system can generate a command to adjust timestamps of transcode commands in the set of transcode commands and/or a command to adjust the timestamps of the video and audio frames in the mezzanine segment.

10.5 Audio Replacement Command

In one example, the computer system can emulate transcoding of the video file to derive the sequence of video characteristics of the video file by: identifying a target expression in the audio stream of the video file via a speech recognition model; generating a slate insertion flag to replace an audio segment corresponding to the target expression with a slate audio; and adding the slate insertion flag and a timestamp of the audio segment to the sequence of video characteristics. In this implementation, the computer system can also transform the first subset of instream video characteristics and the first subset of upstream video characteristics into a first set of transcode commands by converting the slate insertion flag in the first subset of instream video characteristics into a slate insertion command containing a link to a slate audio and the timestamp for audio insertion. Therefore, the computer system can identify an audio segment containing the target expression (e.g., profanity) in the audio stream of a video, and add an audio replacement flag to the timed command stream. Then, based on identifying the audio replacement flag in a subset of instream video characteristics associated with a mezzanine segment, the computer system can generate a command to replace the audio segment containing the target expression with a slate audio and insert this audio-replacement command into the mezzanine segment via a command frame.

10.6 Audio-Insertion Command

In one example, the computer system can emulate transcoding of the first mezzanine segment to derive a sequence of segment characteristics of the first mezzanine segment by: emulating transcoding of the video stream to derive the sequence of segment characteristics including an audio gap occurring at a first time in the first mezzanine segment and lasting a first time duration; and adding to the sequence of segment characteristics a slate insertion flag indicating the audio gap occurring at the first time in the first mezzanine segment and having the first time duration. In this implementation, the computer system can further transform the sequence of segment characteristics into a third set of transcode commands by transforming the sequence of segment characteristics into an audio insertion command in the set of transcode commands, the audio insertion command including instructions to replace the audio gap with an audio from a given web address. Therefore, the computer system can emulate transcoding to detect a gap (e.g., missing audio frames) in the audio associated with a mezzanine segment. In response to detecting the audio gap, the computer system can generate a transcode command to replace the audio gap with an audio from a certain web address. The computer system can then store the transcode command in one or more command frames of the mezzanine segment such that the transcode command can be retrieved during transcoding of the mezzanine segment.

11. Command Frame Encoding

Blocks S156 and S157 of the method S100 recite: storing the first set of transcode commands in a first command frame; and inserting the first command frame into the first mezzanine segment. Generally, in Blocks S156 and S157, the computer system can generate one or more command frames that include transcode commands and insert the one or more command frames into a mezzanine segment.

In another implementation, the codifier: compiles these commands into a timeseries of command frames based on times—within the first mezzanine segment—of each individual command; and inserts these command frames into the first mezzanine segment according to their corresponding times.

More specifically, in this implementation, for each time instance—within the boundaries of the first segment—associated with at least one command, the codifier can: generate one command frame containing all commands concurrent with this time instance (and a command to delete the command frame from the output rendition segment); and insert this command frame into the first mezzanine segment just before a video frame corresponding to this time instance.

For example, the codifier can: initialize a blank command frame defining an image size matched to other frames in the first mezzanine segment; write a first numerical or alphanumerical identifier code for command frames into the command frame; convert each command concurrent with a particular time instance within the boundary of the first mezzanine segment into additional numerical or alphanumerical code; write these numerical or alphanumerical code into the command frame; encode any audio lead in, audio lead out, and/or slate image paired with these commands directly into the command frame; and insert the command frame—now populated with numerical or alphanumerical codes—into the mezzanine segment between two consecutive frames that span the particular time instance.

In one implementation, the computer system can, for each video characteristic in the first subset of instream video characteristics, generate a transform command associated with a time instance of the video characteristic in the first segment of the timed command stream. Therefore, the computer system can generate a sequence of transform commands where each transform command in the sequence of transform commands is associated with a time instance for command execution. In this implementation, the computer system also can, for each time instance associated with at least one transcode command, generate a command frame in the sequence of command frames containing all commands concurrent with the time instance. Furthermore, for each command frame in the set of command frames, the computer system can insert the command frame into the second mezzanine segment upstream of a video frame corresponding to a time instance associated with the command frame. Therefore, the computer system can, for each time instance within the boundaries of the first segment (e.g., first segment of the timed command stream corresponding to the first mezzanine segment): generate one command frame containing all transcode commands concurrent with this time instance; and insert this command frame into the first mezzanine segment just before a video frame corresponding to this time instance.

Alternatively, the codifier can: tag these commands with corresponding timestamps indicating command start times within the first mezzanine segment or with frame identifiers indicating start frames for commands with the first mezzanine segment; compile these commands—with timestamps and/or frame identifiers—into one command frame; and insert the first command frame into the first mezzanine segment, such as before the first frame in the first mezzanine segment.

In one implementation, the computer system can, for each video characteristic in the subset of instream video characteristics, generate a transcode command tagged with a corresponding timestamp indicating command start time within the mezzanine segment. In this implementation, the computer system can also store the set of transcode commands in the command frame by aggregating each transcode command in the set of transcode commands into the command frame. In this implementation, the computer system can also insert the command frame into the mezzanine segment before the first frame of the second mezzanine segment. Therefore, the computer system can: tag transcode commands with corresponding timestamps indicating command start times within the mezzanine segment; compile these commands into one command frame; and insert the command frame into the mezzanine segment, such as before the first frame in the mezzanine segment.

The codifier can repeat the foregoing process for each other mezzanine segment of the mezzanine and corresponding segment of the timed command stream.

12. Sequencing

In one implementation, the first worker and the codifier simultaneously segment the mezzanine into mezzanine segments and emulate the entire mezzanine, respectively, in order to reduce time from ingest of the raw video file to completion of the output rendition of the video file.

Similarly, the codifier can emulate the entire mezzanine to generate a sequence of video characteristics for the mezzanine as the first worker segments the mezzanine into mezzanine segments. In this implementation, once the first worker completes segmentation and caches the mezzanine segments, the codifier can: map groups of these video characteristics for the entire mezzanine onto individual mezzanine segments; compile commands representing these video characteristics into command frames; and insert these command frames into their corresponding mezzanine segments in the mezzanine cache.

13. Scheduling

The scheduler then: assigns mezzanine segments to a cluster of workers; and releases a mezzanine segment to its assigned worker once the codifier inserts a corresponding command frame (or all corresponding command frames) into the mezzanine segment, as described in U.S. patent application Ser. No. 16/458,630.

14. Transcoding

Blocks S160, S170, S172, S174, S180, and S190 of the method S100, recite, in response to receiving a first request for a first playback segment corresponding to the first mezzanine segment in a first rendition from a video player: accessing the first mezzanine segment; detecting the first command frame in the first mezzanine segment; extracting the first set of transcode commands from the first command frame; updating a first set of transcoding parameters for the first rendition based on the first set of transcode commands; transcoding the first mezzanine segment into a first rendition segment in a first rendition according to the first set of transcoding parameters; and transmitting the first rendition segment to the video player. Generally, in Blocks, S160, S170, S172, S174, S180, and S190, the computer system can: access a mezzanine segment; extract transcode commands from the command frames in the mezzanine segment; and, based on the extracted transcode commands, transcode the mezzanine segment into a target rendition. Thus, the computer system can use the video characteristics of the mezzanine segment that have been derived during transcoding emulation to inform transcoding of the mezzanine segment.

In one implementation, for each mezzanine segment in the series of mezzanine segments, the computer system can: access the mezzanine segment; detect the set of command frames in the mezzanine segment; extract the first set of transcode commands from the set of command frames; based on the first set of transcode commands, transcode the mezzanine segment into a rendition segment in a target rendition; and transmit the rendition segment to a video player. Therefore, the computer system can transcode each mezzanine segment in the sequence of mezzanine segments corresponding to a video file based on transcode commands stored in command frames of each mezzanine segment. Thus, the computer system can use the video characteristics derived during transcoding emulation to inform parallel (e.g., where multiple segments can be transcoded simultaneously) transcoding of the video file into a target rendition.

In another implementation, in response to receiving a second request for the first playback segment corresponding to the first mezzanine segment in a second rendition from the video player, the computer system can: access the first mezzanine segment; detect the second command frame in the first mezzanine segment; extract the second set of transcode commands from the second command frame; update the second set of transcoding parameters for the second rendition based on the first set of transcode commands, transcode the first mezzanine segment into a second rendition segment in a second rendition according to the second set of transcoding parameters; and transmit the first rendition segment to the video player. Therefore, the computer system can transcode the same mezzanine segment into two different renditions based on the transcoding commands stored in one or more command frames of the mezzanine segment. Therefore, the computer system can use the video characteristics derived during transcoding emulation of the video file to inform transcoding of the mezzanine segment into two different renditions.

In another implementation, in response to receiving a second request for a second playback segment corresponding to the second mezzanine segment in the first rendition from the video player, the computer system can: access the second mezzanine segment; detect the first command frame in the second mezzanine segment; extract the first set of transcode commands from the first command frame; update a first set of transcoding parameters for the first rendition based on the first set of transcode commands; transcode the second mezzanine segment into a second rendition segment in a first rendition according to the first set of transcoding parameters; and transmit the second rendition segment to the video player. Therefore, the computer system can transcode two different segments into a single target rendition (e.g., the first rendition) based on the commands stored in the command frames in each of the two mezzanine segments.

Furthermore, the computer system can use the video characteristics derived during transcoding emulation to inform transcoding of the two different mezzanine segments into a target rendition.

A worker executing an instance of the transcoder then receives a mezzanine segment from the mezzanine cache and a trigger to transcode the mezzanine segment. Accordingly, the worker executes commands chronologically as the worker encounters command frames while parsing the mezzanine segment in order to transcode the mezzanine segment into a rendition segment.

In particular, the worker can: ingest the mezzanine segment containing one or a sequence of command frames; execute transcoding methods to parse frames in the mezzanine segment sequentially; and scan these frames sequentially for command frames. Upon detecting a command frame, the worker: extracts a set of commands from the command frame; loads commands extracted from this command frame; and discards (or "deletes") the command frame from the mezzanine segment. The worker then executes and applies these commands when transcoding subsequent frames in the mezzanine segment until the computer system detects a new command frame or reaches an end of the mezzanine segment.

In one implementation, prior to transcoding of the first mezzanine segment, the computer system can detect the first command frame in the first mezzanine segment by: scanning frames in the first mezzanine segment for the command frame identifier; and detecting the first command frame in the first mezzanine segment including the command frame identifier. In this implementation, the computer system also can extract the first set of transcode commands from the first command frame by: in response to detecting the first command frame containing the command frame identifier, extracting the first set of transcode commands from the first command frame. Therefore, the computer system can: detect a command frame containing transcode commands based on a command frame identifier; and, in response to detecting a command frame in the mezzanine segment, extract the transcode commands from the command frame.

For example, the worker can scan each frame in the mezzanine segment for a particular, known numerical or alphanumerical identifier code for command frames. Upon detecting this code in a frame, the worker can: identify the frame as a command frame; extract subsequent numerical or alphanumerical codes from the command frames; convert these codes back into a set of commands, such as by referencing these commands against a lookup table or other decoder; extract any audio lead in data, audio lead out data, and/or slate image from the command frame; load the set of commands; and delete the command frame or otherwise extract and remove the command frame from the mezzanine segment or output rendition segments. (Alternatively, because the codifier encodes a command frame with numerical or alphanumerical codes rather than image-based data, the command frame—contained in the mezzanine segment—may not render or otherwise contain data in a format distinct from an image format. The worker can therefore identify a frame in the mezzanine segment as a command frame if the frame fails to render as the worker parses the frame or if data contained in the frame does not fulfill image-type data characteristics.)

The worker can then scan the next frame in the mezzanine segment for the known numerical or alphanumerical identifier code for command frames. If this code is absent from the next frame, the worker can execute and apply the set of commands when transcoding this next frame, such as including: deleting the frame if specified as a dropped frame by the command frame; replacing the frame with a slate image contained in the command frame or linked to in the command frame; modifying a timestamp of the resulting transcoded frame according to the command frame; and/or temporally aligning audio paired with or contained in the frame according to audio lead in or audio lead out data.

The worker can then repeat this process for each subsequent frame until the worker detects a next command frame or reaches the end of the mezzanine segment.

Upon reaching the conclusion of the mezzanine segment, the worker can: insert the transcoded frames (including transcoded audio and/or video content) into a container, such as with realigned timestamps as prescribed by command frames extracted from the mezzanine segment; and then return and store a resulting rendition segment in a rendition cache.

Therefore, the codifier can insert a slate image (or other media) that is incongruous with (i.e., does not necessary match) the format of other frames in the mezzanine in a command frame in a mezzanine segment. The singular worker can then transcode the entire mezzanine segment with a single encoder to amalgamate the original frames in the mezzanine segment and the slate image into a common format in one smooth, continuous rendition segment.

Each other worker assigned to and transcoding each other mezzanine segment in the mezzanine cache can implement similar methods and techniques to generate, return, and store a rendition segment—for an assigned mezzanine segment—in the rendition cache.

15. Rendition-Based Command Generation

In one variation, the codifier executes the foregoing methods and techniques to: generate a set of timed command streams, each corresponding to a different rendition (e.g., transcoded output bitrate and resolution pair) in a ladder; convert each timed command stream into a sequence of commands paired or tagged with their corresponding rendition; encode these commands—tagged with their corresponding rendition—in command frames; and insert these command frames into their corresponding mezzanine segments in the mezzanine cache. During later transcoding, a worker can: receive a mezzanine segment and identification of a particular rendition; load and execute commands extracted from command frames in this assigned mezzanine segment and tagged with the particular rendition; discard all other commands; and output the resulting rendition segment to the rendition cache.

For example, the codifier can retrieve or access: a first slate image exhibiting a large typeface and assigned to 240p output renditions; a second slate image with smaller typeface and assigned to 1080p output renditions; and a third sequence of animated slate images with small typeface and assigned to 4K output renditions. Accordingly, the codifier selectively encodes these slate images—with corresponding output rendition tags—into command frames injected into mezzanine segments containing blank or absent frames.

In this example, the scheduler queues workers to transcode individual mezzanine segments according to the 1080p output rendition. A worker executing an instance of the encoder then receives: a mezzanine segment from the mezzanine cache; identification of the 1080p output rendition; and a trigger to transcode the mezzanine segment according to the 1080p output rendition. The worker then: executes methods and techniques described above to detect and extract commands from command frames in the mezzanine segment; loads and executes commands tagged with the 1080p output rendition, including loading the second slate image; transcodes this mezzanine segment in 1080p output rendition, including replacing blank frames in the mezzanine segment with the second slate image; discards all commands not affiliated with the 1080p output rendition; and returns the resulting rendition segment to the rendition cache.

In a similar implementation, the computer system can emulate transcoding of the video file based on the first set of transcoding parameters associated with the first rendition to derive a sequence of video characteristics. In this implementation, for each rendition in a set of available target renditions, the computer system further can: initialize an additional timed command stream synchronized to the video stream of the video file, the additional timed command stream corresponding to the rendition; emulate transcoding of the video file based on a set of transcoding parameters associated with the rendition, to derive an additional sequence of video characteristics; and populate the additional timed command stream with the additional sequence of video characteristics. The computer system further can, for each mezzanine segment, in the series of mezzanine segments: retrieve an additional subset of instream video characteristics, in the additional sequence of video characteristics, contained within a segment of the additional timed command stream corresponding to the mezzanine segment; retrieve an additional subset of upstream video characteristics, in the additional sequence of video characteristics, preceding the segment of the additional timed command stream corresponding to the mezzanine segment; transform the additional subset of instream video characteristics and the additional subset of upstream video characteristics into an additional sequence of transcode commands; store the additional sequence of transcode commands in an additional sequence of command frames; and insert the additional sequence of command frames into the mezzanine segment. Therefore, the computer system can, for each rendition in a set of available target renditions: generate a timed command stream associated with the rendition; emulate transcoding the video file according to the rendition to derive a sequence of video characteristics; and store the sequence of video characteristics in the command stream associated with the rendition. Then, for each rendition in a set of available target renditions, the computer system can: identify a subset of instream video characteristics and a subset of upstream video characteristics corresponding to each mezzanine segment in the series of mezzanine segments; transform the subset of instream video characteristics and the subset of upstream video characteristics into transform commands for each mezzanine segment in the series of mezzanine segments; and insert the transform commands as command frames into each mezzanine segment in the series mezzanine segments. Thus, the computer system can emulate transcoding for each rendition in the set of available target renditions separately.

16. Live Raw Video Ingest with Real-Time Transcoding

In one variation, the computer system ingests a live video, such as in a mezzanine format. Accordingly: the first worker can segment this live video into mezzanine segments; and the codifier can execute methods and techniques described above to emulate transcoding of the video file, generate a timed command stream paired with the live video based on transcoding emulation, and insert command frames into individual mezzanine segments based on this timed command stream.

In one implementation, the worker: segments the live video feed into mezzanine segments, such as based on keyframes and minimum and maximum segment durations; and stores these video segments in a mezzanine cache, as described in U.S. patent application Ser. No. 16/458,630. The codifier: retrieves a target bitrate and resolution (and frame rate, variable or constant bitrate setting, etc.) for a transcoded output rendition of the live video feed; and concurrently processes the live video feed by emulating a transcoder based on these transcoding parameters.

In one implementation, for each subsequent period (e.g., two-second, five-second period) of the live video feed ingested, the first worker defines a mezzanine segment containing the period of the live video feed and writes the mezzanine segment to the mezzanine cache. The codifier concurrently: emulates transcoding of the entire live video feed received up to the current time to derive a series of video characteristics for the entire live video feed; stores these video characteristics in a timed command stream synchronized to the entire live video feed received up to the current time; projects boundaries of the current mezzanine segment onto the timed command stream; extracts commands within and preceding the boundaries of the current mezzanine segment from the timed command stream; compiles these commands into a set of command frames; and then inserts these command frames into the current mezzanine segment. The first worker and the codifier repeat this process for each subsequent period of the live audio feed.

Alternatively, for each subsequent period of the live video feed ingested, the codifier can: emulate transcoding of a limited period of the live video feed preceding and including the current time up to a threshold duration (e.g., 30 seconds or one minute preceding and including the current two-second-long mezzanine segment) to derive a series of video characteristics for this period of the live video feed; store these video characteristics in a timed command stream synchronized to this period of the live video feed; project boundaries of the current mezzanine segment onto the timed command stream; extract commands within and preceding the boundaries of the current mezzanine segment from the timed command stream; compile these commands into a set of command frames; and then insert these command frames into the current mezzanine segment. The first worker and the codifier repeat this process for each subsequent period of the live audio feed.

The scheduler then coordinates assignment and distribution of these mezzanine segments—now containing command frames—to individual workers. These individual workers then transcode their assigned mezzanine segments according to commands stored in these command frames and return rendition segments to the rendition cache, as described above.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprises:
ingesting a video file;
initializing a timed command stream synchronized to a video stream of the video file;
emulating transcoding of the video file to derive a sequence of video characteristics of the video file;
populating the timed command stream with the sequence of video characteristics;
segmenting the video file into a series of mezzanine segments;
for a first mezzanine segment, in the series of mezzanine segments:
retrieving a first subset of instream video characteristics, in the sequence of video characteristics, contained within a first segment of the timed command stream corresponding to the first mezzanine segment;
retrieving a second subset of upstream video characteristics, in the sequence of video characteristics, preceding the first segment of the timed command stream;
transforming the first subset of instream video characteristics and the second subset of upstream video characteristics into a first sequence of transcode commands;
storing the first sequence of transcode commands in a first sequence of command frames; and
inserting the first sequence of command frames into the first mezzanine segment;
for a second mezzanine segment, in the series of mezzanine segments:
retrieving a third subset of instream video characteristics, in the sequence of video characteristics, contained within a second segment of the timed command stream corresponding to the second mezzanine segment;
transforming the third subset of instream video characteristics into a second sequence of transcode commands;
storing the second sequence of transcode commands in a second sequence of command frames; and
inserting the second sequence of command frames into the second mezzanine segment; and
in response to receiving a first request for a first playback segment corresponding to the first mezzanine segment in a first rendition from a video player:
accessing the first mezzanine segment;
detecting the first sequence of command frames in the first mezzanine segment;
extracting the first sequence of transcode commands from the first sequence of command frames;
updating a first set of transcoding parameters for the first rendition based on the first sequence of transcode commands;
transcoding the first mezzanine segment into a first rendition segment in the first rendition according to the first set of transcoding parameters; and
transmitting the first rendition segment to the video player.

2. The method of claim 1:
wherein emulating transcoding of the video file to derive the sequence of video characteristics of the video file comprises:
emulating transcoding of the video file based on the first set of transcoding parameters for the first rendition to derive the sequence of video characteristics;
wherein retrieving the first subset of instream video characteristics contained within the first segment of the timed command stream corresponding to the first mezzanine segment comprises:
retrieving the first subset of instream video characteristics comprising a frame rate of the first segment of the timed command stream exceeding a target frame rate associated with the first rendition; and
wherein transforming the first subset of instream video characteristics and the second subset of upstream video characteristics into the first sequence of transcode commands comprises:
transforming the first subset of instream video characteristics into a framerate downsampling command in the first sequence of transcode commands, the framerate downsampling command comprising instructions to drop frames in the first mezzanine segment.

3. The method of claim 1:
wherein retrieving the first subset of instream video characteristics contained within the first segment of the timed command stream corresponding to the first mezzanine segment comprises:
retrieving the first subset of instream video characteristics comprising a missing frame corresponding to a timestamp in the first segment of the timed command stream; and
in response to retrieving the first subset of instream video characteristics comprising the missing frame, adding, to the first subset of instream video characteristics, a slate insertion flag indicating the missing frame and the timestamp in the missing frame; and
wherein transforming the first subset of instream video characteristics and the second subset of upstream video characteristics into the first sequence of transcode commands comprises:
converting the slate insertion flag in the first subset of instream video characteristics into a slate insertion command in the first sequence of transcode commands, the slate insertion command containing a link to a slate image and the timestamp, the timestamp indicating a temporal position in the first mezzanine segment for slate image insertion.

4. The method of claim 3, wherein transcoding the first mezzanine segment into the first rendition segment comprises:
accessing the slate image via the link to the slate image;
generating a blank frame at the timestamp in the first rendition segment; and
inserting the slate image into the blank frame.

5. The method of claim 1:
wherein retrieving the first subset of instream video characteristics contained within the first segment of the timed command stream corresponding to the first mezzanine segment comprises:
retrieving the first subset of instream video characteristics comprising an audio lead-in characteristic of the first segment of the timed command stream;
wherein retrieving the second subset of upstream video characteristics preceding the first segment of the timed command stream comprises:
retrieving the second subset of upstream video characteristics comprising an audio lead-out characteristic of a third segment of the timed command stream, the third segment preceding the first segment of the timed command stream; and
wherein transforming the first subset of instream video characteristics and the second subset of upstream video characteristics into the first sequence of transcode commands comprises:
converting the audio lead-in characteristic and the audio lead-out characteristic in the first subset of instream video characteristics and the second subset of upstream video characteristics into an audio synchronization command in the first sequence of transcode commands, the audio synchronization command comprising instructions to synchronize a first audio stream of the first segment and the second audio stream of the third segment.

6. The method of claim 1:
wherein retrieving a third subset of instream video characteristics contained within a second segment of the timed command stream corresponding to the second mezzanine segment comprises:
retrieving a third subset of instream video characteristics comprising a first container of second mezzanine segment, the first container of the second mezzanine segment supporting a different time basis than a second container associated with a target rendition; and
wherein transforming the third subset of instream video characteristics into the second sequence of transcode commands comprises:
transforming the third subset of instream video characteristics into a command in the second sequence of transcode commands, the command comprising instructions to convert timestamps associated with video characteristics in the third subset of instream video characteristics from a mezzanine time basis to a target time basis associated the target rendition.

7. The method of claim 1, further comprising, in response to receiving a second request for the first playback segment corresponding to the first mezzanine segment in a second rendition from the video player:
accessing the first mezzanine segment;
detecting the first sequence of command frames in the first mezzanine segment;
extracting the first sequence of transcode commands from the first sequence of command frames;
updating a second set of transcoding parameters for the second rendition based on the first sequence of transcode commands;
transcoding the first mezzanine segment into a second rendition segment in a second rendition according to the second set of transcoding parameters; and
transmitting the second rendition segment to the video player.

8. The method of claim 1, further comprising, in response to receiving a second request for a second playback segment corresponding to the second mezzanine segment in the first rendition from the video player:
accessing the second mezzanine segment;
detecting the second sequence of command frames in the second mezzanine segment;
extracting the second sequence of transcode commands from the second sequence of command frames;
updating the first set of transcoding parameters based on the second sequence of transcode commands;
transcoding the second mezzanine segment into a second rendition segment in a first rendition according to the first set of transcoding parameters; and
transmitting the second rendition segment to the video player.

9. The method of claim 1, wherein segmenting the video file into the series of mezzanine segments comprises:
segmenting the video file into the series of mezzanine segments, wherein each mezzanine segment in the series of mezzanine segments corresponds to a playback segment of the video file in a mezzanine format; and
storing the series of mezzanine segments in a mezzanine cache.

10. The method of claim 1:
wherein emulating transcoding of the video file to derive the sequence of video characteristics of the video file comprises:
emulating transcoding of the video file based on a second set of transcoding parameters associated with a set of supported renditions, the set of supported renditions comprising the first rendition;
wherein extracting the first sequence of transcode commands from the first sequence of command frames comprises:
extracting a subset of transcode commands from the first sequence of transcode commands, the subset of transcode commands corresponding to commands for the first rendition; and
wherein updating a first set of transcoding parameters for the first rendition based on the first sequence of transcode commands comprises:
updating a first set of transcoding parameters based on the subset of transcode commands.

11. The method of claim 1:
wherein emulating transcoding of the video file to derive the sequence of video characteristics of the video file comprises:
emulating transcoding of the video file based on the first set of transcoding parameters associated with the first rendition; and
further comprising, for each rendition in a set of available target renditions:
initializing an additional timed command stream synchronized to the video stream of the video file, the additional timed command stream corresponding to the rendition;
emulating transcoding of the video file based on a set of transcoding parameters associated with the rendition, to derive an additional sequence of video characteristics;
populating the additional timed command stream with the additional sequence of video characteristics; and
for each mezzanine segment, in the series of mezzanine segments:

retrieving an additional subset of instream video characteristics, in the additional sequence of video characteristics, contained within a segment of the additional timed command stream corresponding to the mezzanine segment;

retrieving an additional subset of upstream video characteristics, in the additional sequence of video characteristics, preceding the segment of the additional timed command stream corresponding to the mezzanine segment;

transforming the additional subset of instream video characteristics and the additional subset of upstream video characteristics into an additional sequence of transcode commands;

storing the additional sequence of transcode commands in an additional sequence of command frames; and inserting the additional sequence of command frames into the mezzanine segment.

12. The method of claim 1:
wherein emulating transcoding of the video file to derive the sequence of video characteristics of the video file comprises:
via a speech recognition model, identifying a target expression in the audio stream of the video file;
generating a slate insertion flag to replace an audio segment corresponding to the target expression with a slate audio; and
adding the slate insertion flag and a timestamp of the audio segment to the sequence of video characteristics; and
wherein transforming the first subset of instream video characteristics and the first subset of upstream video characteristics into the first sequence of transcode commands comprises:
converting the slate insertion flag in the first subset of instream video characteristics into a slate insertion command containing a link to a slate audio and the timestamp for audio insertion.

13. The method of claim 1:
wherein retrieving the first subset of instream video characteristics contained within the first segment of the timed command stream corresponding to the first mezzanine segment comprises:
locating segment boundaries of the first mezzanine segment in the first segment of the timed command stream; and
aggregating video characteristics within the segment boundaries in the first segment of the timed command stream into the first subset of instream video characteristics; and
wherein retrieving the second subset of upstream video characteristics preceding the first segment of the timed command stream comprises:
locating an upstream segment boundary of the first mezzanine segment in the first segment of the timed command stream; and
aggregating video characteristics preceding the upstream segment boundary in the first segment of the timed command stream into the second subset of upstream video characteristics.

14. The method of claim 1:
wherein detecting the first sequence of command frames in the first mezzanine segment comprises:
scanning each frame in the first mezzanine segment for a command frame identifier; and
detecting the first sequence of command frames, each frame in the first sequence of command frames comprising the command frame identifier; and
wherein extracting the first sequence of transcode commands from the first sequence of command frames comprises:
in response to detecting the first sequence of command frames containing the command frame identifier, extracting the first sequence of transcode commands from the first sequence of command frames.

15. The method of claim 1:
wherein transforming the first subset of instream video characteristics and the second subset of upstream video characteristics into the first sequence of transcode commands comprises, for each video characteristic in the first subset of instream video characteristics and the second subset of upstream video characteristics:
generating a transform command associated with a time instance of the video characteristic in the first segment of the timed command stream;
wherein storing the first sequence of transcode commands in the first sequence of command frames comprises, for each time instance associated with a transcode command in the first sequence of transcode commands:
generating a command frame in the first sequence of command frames containing all commands concurrent with the time instance; and
wherein inserting the first sequence of command frames into the first mezzanine segment comprises, for each command frame in the first sequence of command frames:
inserting the command frame into the first mezzanine segment upstream of a video frame corresponding to a time instance associated with the command frame.

16. A method includes:
ingesting a video stream;
initializing a timed command stream synchronized to the video stream;
emulating transcoding of the video stream to derive a sequence of video characteristics of the video stream;
populating the timed command stream with the sequence of video characteristics;
segmenting the video stream into a series of mezzanine segments;
for a first mezzanine segment, in the series of mezzanine segments:
retrieving a first subset of upstream video characteristics, in the sequence of video characteristics, preceding a first segment of the timed command stream corresponding to the first mezzanine segment;
transforming the first subset of upstream video characteristics into a first set of transcode commands;
storing the first set of transcode commands in a first command frame; and
inserting the first command frame into the first mezzanine segment;
for a second mezzanine segment, in the series of mezzanine segments:
retrieving a second subset of upstream video characteristics, in the sequence of video characteristics, preceding a second segment of the timed command stream corresponding to the second mezzanine segment;
transforming the second subset of upstream video characteristics into a second set of transcode commands;
storing the second set of transcode commands in a second command frame; and inserting the second command frame into the second mezzanine segment; and in response to receiving a first request for a first playback segment corresponding to the first mezzanine segment in a first rendition from a video player:
accessing the first mezzanine segment;
emulating transcoding of the first mezzanine segment to derive a sequence of segment characteristics of the first mezzanine segment;
transforming the sequence of segment characteristics into a third set of transcode commands;
extracting the first set of transcode commands from the first command frame;
transcoding the first mezzanine segment into a first rendition segment in the first rendition based on the first set of transcode commands and the third set of transcode commands; and
transmitting the first rendition segment to the video player.

17. The method of claim 16:
wherein emulating transcoding of the video stream to derive the sequence of video characteristics of the video stream comprises:
parsing frames in the video stream chronologically;
at a first time in the video stream, identifying a first video characteristic; and
at a second time in the video stream, identifying a second video characteristic; and
wherein populating the timed command stream with the sequence of video characteristics comprises:
appending the first video characteristic to the timed command stream at a first time instance corresponding to the first time in the video segment; and
appending the second video characteristic to the timed command stream at a second time instance corresponding to the second time in the video segment.

18. The method of claim 16:
wherein transforming the first subset of instream video characteristics into the first set of transcode commands comprises, for each video characteristic in the first subset of instream video characteristics:
generating a transcode command tagged with a corresponding timestamp indicating command start time within the first mezzanine segment;
wherein storing the first set of transcode commands in the first command frame comprises:
aggregating each transcode command tagged with the corresponding timestamp in the first set of transcode commands into the first command frame; and wherein inserting the first command frame into the first mezzanine segment comprises:
inserting the first command frame into the first mezzanine segment before a first frame of the first mezzanine segment.

19. A method includes:
ingesting a video file;
initializing a timed command stream synchronized to a video stream of the video file;
emulating transcoding of the video file to derive a sequence of video characteristics of the video file;
populating the timed command stream with the sequence of video characteristics;
segmenting the video file into a series of mezzanine segments; and
during a first time period:
for each mezzanine segment, in the series of mezzanine segments:
retrieving a subset of instream video characteristics, in the sequence of video characteristics, contained within a segment of the timed command stream corresponding to the mezzanine segment;
retrieving a subset of upstream video characteristics, in the sequence of video characteristics, preceding the segment of the timed command stream;
transforming the subset of instream video characteristics and the subset of upstream video characteristics into a set of transcode commands;
storing the set of transcode commands in a set of command frames;
inserting the set of command frames into the mezzanine segment; and
storing the mezzanine segment in a mezzanine cache; and
during a second time period:
for each mezzanine segment, in the series of mezzanine segments;
accessing the mezzanine segment;
detecting the set of command frames in the mezzanine segment;
extracting the set of transcode commands from the set of command frames;
based on the first set of transcode commands, transcoding the mezzanine segment into a rendition segment in a target rendition; and
storing the rendition segment in a rendition cache.

* * * * *